METHOD OF MANUFACTURING MAGNETIC TAPE TRANSDUCER HEADS

Filed Dec. 29, 1965 2 Sheets-Sheet 1

INVENTOR
JACK L. METZ

BY R. C. Perry

ATTORNEY

METHOD OF MANUFACTURING MAGNETIC TAPE TRANSDUCER HEADS

Filed Dec. 29, 1965 2 Sheets-Sheet 2

United States Patent Office 3,391,453

Patented July 9, 1968

3,391,453
METHOD OF MANUFACTURING MAGNETIC TAPE TRANSDUCER HEADS

Jack L. Metz, Des Plaines, Ill., assignor to Teletype Corporation, Skokie, Ill., a corporation of Delaware Filed Dec. 29, 1965, Ser. No. 517,245
13 Claims. (Cl. 29—603)

ABSTRACT OF THE DISCLOSURE

A method of manufacturing multiple track magnetic tape transducer heads including the steps of:

forming a plurality of core halves and a pair of locating surfaces in each of two sheets of magnetic material,
forming a plurality of core half receiving slots and a pair of locating surfaces in each of two housing half blocks formed of non-magnetic material,
positioning one of the core half sheets in each of the housing halves with the core halves positioned in the core half slots and with the locating surfaces of the sheets in engagement with the locating surfaces of the housing halves,
attaching the core halves and the locating surfaces of the core half sheets to the housing halves,
removing the portions of the core half sheets other than the core halves and the locating surfaces from the housing halves while leaving the core halves and the locating surfaces of the sheets attached to the housing halves,
positioning a coil of conductive material around a portion of each core half in one of the housing halves,
joining the two housing halves with the core halves of one housing half in engagement with the core halves of the other housing half and with the coils of conductive material surrounding a portion of a core half in each housing half, and
machining the joined housing halves to a predetermined shape with respect to the locating surfaces which formed part of the core half sheets.

This invention relates to methods of manufacturing magnetic tape transducer heads and more particularly to methods of manufacturing multiple track heads for magnetic tape recording apparatus.

In the manufacture of magnetic tape transducer heads extreme accuracy in the alignment and spacing of the components is required. This fact and the fact that the components employed in magnetic tape transducer heads are often very small and delicate has heretofore made the manufacture of magnetic tape transducer heads very complicated and expensive.

Accordingly, an object of this invention is to simplify the manufacture of magnetic tape transducer heads.

Another object of this invention is to reduce the cost of manufacturing magnetic tape heads.

A further object of this invention is to provide a magnetic tape transducer head of relatively low cost and of durable construction.

In accordance with the preferred embodiment of the invention these and other objects are achieved in a method of making multiple track transducer heads by forming a plurality of interconnected core halves in two sheets of magnetic material. The sheets of interconnected core halves are mounted in individual housings and the interconnecting portions of the sheets are removed. Coils of conductive material are then placed on the mounted core halves on one of the housings and the core halves on the other of the housings are moved through the coils and into engagement with the core halves on the one of the housings. Finally, the housings are joined together so that a multiple track magnetic tape transducer head is formed, each track including a core half in one of the housings, a core half in the other of the housings and a coil.

A more complete understanding of the invention may be had by referring to the following detailed description when taken in conjunction with the drawings wherein.

Figure 1:
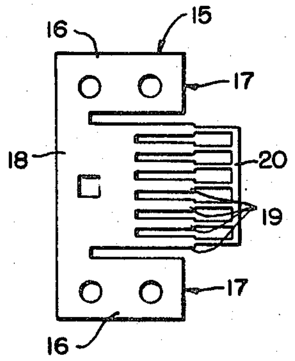
FIG. 1 is a top view of a partially completed sheet of core halves.

Referring now to the drawings, wherein like reference numerals designate like parts throughout the several views, with particular reference being had to FIG. 1, there is seen a partially completed core half sheet 15. The core half sheet 15 is formed from a magnetic material and is comprised of two locating portions 16 each having a locating surface 17 formed thereon, a bridge section 18 between the locating portions 16, a plurality of core halves 19 and a bridge section 20 interconnecting the core halves 19, the core half sheet 15 may be formed by any suitable manner such as by casting or by stamping the sheet from a larger sheet of magnetic material.

Figure 2:
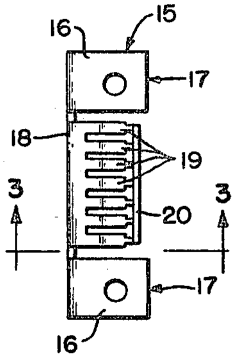
FIG. 2 is a top view of a completely formed sheet of core halves.
Figure 3:
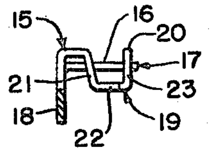
FIG. 3 is a sectional view taken along the line 3—3 in FIG. 2 in the direction of the arrows.

In FIGS. 2 and 3 the core half sheet 15 is shown in a fully formed condition. The fully formed sheet is the same as the partially formed sheet shown in FIG. 1 except that the bridge portion 18 is bent downwardly at right angles to the locating portion 16 and the core halves 19 are formed into a U-shaped configuration so that, as is shown in FIG. 3, the core halves 19 are each defined by a first leg 21, a bottom leg 22 and a second leg 23. The core halves 19 remain interconnected by the bridge portion 20 and connected to the bridge portion 18 so that their alignment one with the other and their positioning with respect to the locating surfaces 17 of the locating portions 16 is maintained. After the core half sheets 15 are formed into the configuration shown in FIGS. 2 and 3 they are annealed to a dead soft condition so that their magnetic permeability is raised to a maximum level.

Figure 4:
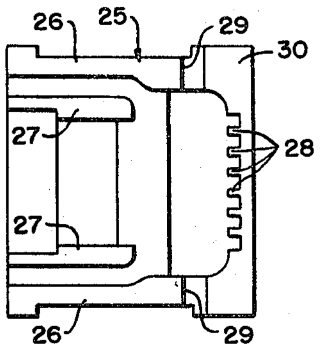
FIG. 4 is a top view of a fully formed housing.

In FIG. 4 there is shown a housing 25 which may be formed by any suitable manner such as die casting, investment casting, etc. The housing 25 is formed from a nonmagnetic material and is used as a support member for the core halves 19 of the core half sheets 15. The housing 25 has an internal cavity which is generally defined by a pair of side walls 26 of the housing 25. Between the side walls 26 a pair of upstanding projections 27 are provided which serve to define potting channels between the projections 27 and the side walls 26 and which also serve to define a connector pin cavity between the projections 27. At the right-hand end (FIG. 4) there is formed in the housing 25 a plurality of core half locating slots which are separated one from the other by a plurality of ribs 28.

After the housing 25 is rough formed, its right-hand end (FIG. 4) is machined to provide a pair of locating surfaces 29 and a platform surface 30. The locating surfaces 29 and the platform surface 30 are used to position a sheet of core halves 15 with respect to the remaining surfaces of the housing 25 such that the core half sheet 15, when placed on the housing 25, will be properly positioned with respect to the housing.

Figure 5:
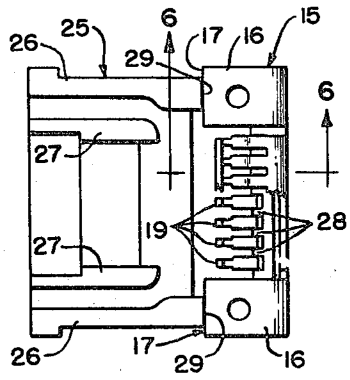
FIG. 5 is a top view of a housing with a sheet of core halves mounted thereon.

In FIG. 5 there is shown a housing 25 with one of the core half sheets 15 placed thereon. When the core half sheet 15 is placed on a housing 25 it is properly aligned with respect to the housing by bringing the locating surfaces 17 on the locating portions 16 of the sheet 15 into engagement with the locating surfaces 29 of the housing and by resting the locating portions 16 of the sheet 15 on the platform surface 30 of the housing. As the sheet 15 is brought into engagement with the housing 25 the individual core halves 19 of the sheet 15 are placed in the core half receiving slots as defined by the ribs 28, so that each of the core halves 19 is positioned in one of the core half receiving slots.

After the sheets 15 are properly positioned on the housing 25 the individual core halves 19 and the locating portions 16 of the sheet 15 are each individually attached to the housing 25. In the preferred embodiment this is accomplished by cementing so that a layer of cement 31 is formed between the housing 25 and the bottom wall 22 and the first wall 21 of the core halves 19 and so that a layer of cement 32 is formed between the platform surface 30 of the housing 25 and the locating portions 16 of the sheet 15.

Figure 6:
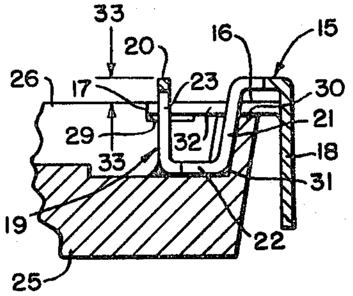
FIG. 6 is an enlarged partial sectional view taken along the line 6—6 in FIG. 5 in the direction of the arrows.

After the core halves 19 and the locating portions 16 are attached to the housing 25 the bridge portion 20 and parts of the bridge portion 18, which have served to support and position the core halves 19 during their positioning in and attachment to the housing 25, are removed. This is accomplished by machining away all of the sheet 15 which is between the arrows 33 in FIG. 6. After the machining operation the core halves 19 are separate from one another as is shown in the lower portion of FIG. 5.

Figure 7:
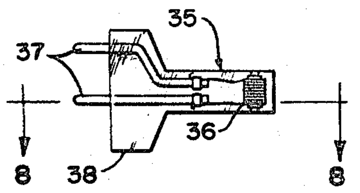
FIG. 7 is a side view of a coil unit.
Figure 8:
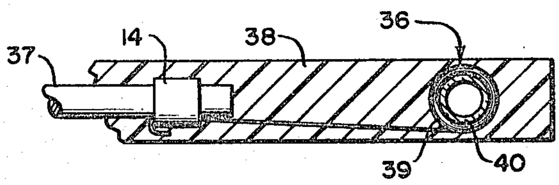
FIG. 8 is an enlarged partial sectional view of the coil unit shown in FIG. 7 taken along the line 8—8 in FIG. 7 in the direction of the arrows.

Referring now to FIG. 7 there is shown a coil unit 35 for use in manufacturing a magnetic tape transducer head in accordance with the present invention. The coil units 35 are formed by connecting a coil of conductive material 36 to a pair of terminal pins 37 and by surrounding the coil 36 and the righthand (FIG. 7) portions of the pins 37 with a body of insulating material 38. As is best shown in FIG. 8, the coils 36 are formed by winding a wire 39 of extremely small diameter onto a glass bobbin 40. The leading ends of the wire are joined to collars 41 which are in turn positioned on the pins 37. The collars 41 and the leading ends of the coil of wire 39 are then soldered to the pins 37 so that an electrical connection is formed between the pins 37 and the coil 36. When the body 38 is formed around the pins 37 and the coil 36 a hole is left in the body 38 which extends axially through the coil 36 so that the legs of the core halves 19 may be positioned within the coils.

Figure 9:
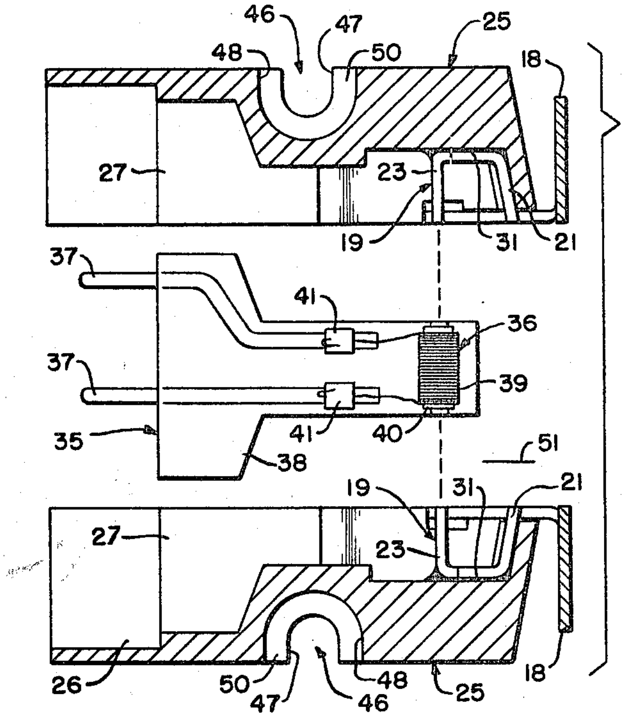
FIG. 9 is an enlarged exploded view showing the manner of assembling magnetic tape transducer heads according to the present invention.
Figure 13:
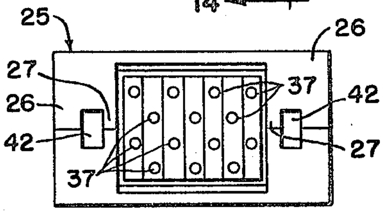
FIG. 13 is a rear view of a completed magnetic tape transducer head.

Referring now to FIG. 9 the manner of assembling the magnetic tape transducer heads in accordance with the present invention is shown. A pair of housings 25 each having a plurality of individual core halves 19 mounted thereon are positioned one over the other with the first legs 21 of the core halves 19 in one of the housings aligned with the first legs 21 of the core halves 19 of the other of the housings and with the second legs 23 of the core halves 19 of one of the housings 25 aligned with the second legs 23 of the core halves 19 of the other of the housings 25. A shim 51 which is comprised of a very thin layer of nonmagnetic material, is placed between the first legs 21 of the core halves 19 of each of the housings 25. A plurality of coil units 35, equal in number to the number of core halves 19 in each of the housings 25, are positioned with the coils 36 of the coil units 35 in an axial alignment with the second legs 23 of the core halves 19 of each of the housings 25. The terminal pins 37 of the coil units 35 are suitably aligned so that after assembly the terminal pins 37 of all of the coil units 35 will form a connector pin array as is best shown in FIG. 13. After the component parts are properly aligned, the two housings 25 are brought together by a vertical movement (FIG. 9) thereby forming multiple track transducer heads comprised of a plurality of single track magnetic transducers each consiting of a core half 19 in one of the housings, a coil unit 35 and a core half 19 in the other of the housings.

Figure 14:
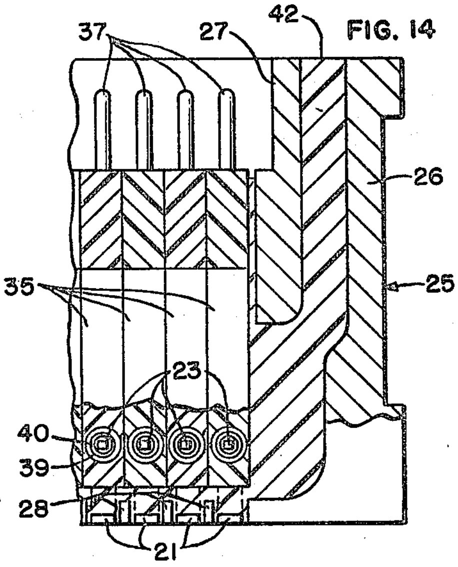
FIG. 14 is an enlarged partial sectional view taken along the line 14—14 in FIG. 12 in the direction of the arrows.

After assembly the magnetic tape transducer head is completed by pouring a setting resin down a hole 42 which is formed when the side walls 26 and the upstanding projections 27 of the two housings 25 are brought together. As is best shown in FIGS. 12 and 14, this causes the resin to completely fill all the voids and cavities in the structure so that the resulting magnetic core head is a unitary structural assembly.

Figure 10:
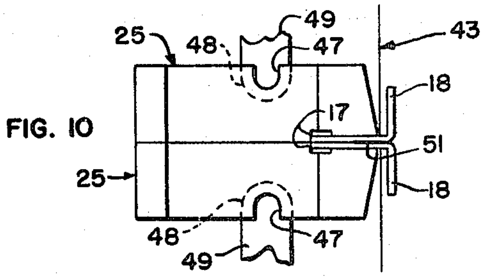
FIG. 10 is a top view of an assembled magnetic tape transducer head.
Figure 11:
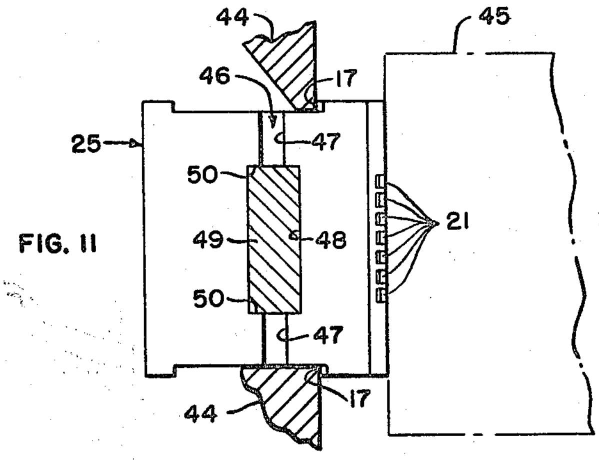
FIG. 11 is a side view of an assembled magnetic tape transducer head showing the head being ground.

After the resin has set, the bridge portions 18 are removed from the locating portions 16 by sawing or other such machining process along the line 43 in FIG. 10. Upon completion of the sawing operation, the magnetic tape transducer head is substantially completed except that a wall of metal of considerable thickness lies to the right (FIGS. 6 and 9) of the first legs 21 of the core halves 19. This wall of metal is removed by grinding as is shown in FIG. 11. The grinding operation is controlled by placing the completed magnetic tape transducer head in a grinding jig and by bringing the locating surfaces 17 of the locating portions 16 into engagement with the locating members 48 of the grinding machine. Since the core halves 19 and the locating portions 16 were placed in the housing 25 as a unitary structure, their positioning with respect to each other is known. Accordingly, by controlling the positions of a grinding wheel 45 with respect to the locating surfaces 17, the amount of metal cut away from the housing 25 and the proper amount of exposure of the first legs 21 of the core halves 19 can be controlled.

As is best shown in FIGS. 9, 10, 11 and 12 the housing members 25 have a slot 46, comprised of reduced diameter outer portions 47 and an enlarged diameter inner portion 48, formed in their outer surfaces. The slots 46 have been found very useful in the manufacture of magnetic tape heads because they may be employed to locate and position the heads during all phases of manufacture. For example, magnetic tape heads may be temporarily stored between operations by sliding the heads onto a pair of rods of approximately the same diameter as the reduced outer portions 47 and positioned apart from each other a distance approximately equal to the distance between the slots. Additionally, as is shown in FIGS. 10 and 11, the heads may be gripped for machining operations by inserting gripping members 49 in the enlarged inner portions 48. Finally, the completed transducer heads may be attached to a mounting plate by placing screws in the reduced outer portions 47 of the slots 46 and by tightening the heads of the screws against the walls 50 between the inner and outer portions of the slot.

Figure 12:
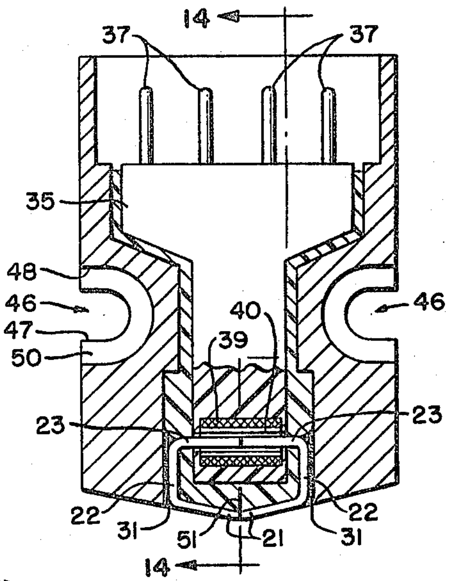
FIG. 12 is an enlarged, full, transverse sectional view of a completed magnetic tape transducer head manufactured in accordance with the present invention.

In FIG. 12 a sectional view of a completed magnetic tape transducer head is shown. It should be noted that the second legs 23 of the core halves 19 abut one another inside a coil 36 of one of the coil units 35 and that the first legs 21 of the core halves are separated by the shim 51. It should also be noted that the entire structure, except for the connector pin cavity in the upper portion (FIG. 12), is completely filled with resin so that a unitary structure results.

FIG. 14 is an enlarged sectional view which, in addition to FIG. 12, shows the unitary nature of the completed magnetic tape transducer head. FIG. 14 also illustrates how the bottom portions (FIG. 14) of the housing 25 are machined away so as to expose the first legs 21 of the core halves 19. This facilitates recording or reproducing with the resulting head since a piece of magnetic tape will be placed in direct contact with the first legs 21 at the non-magnetic gap formed by the shim 51.

Although only one embodiment of the invention is shown in the drawings and described in the foregoing specification, it will be understood that invention is not limited to the specific embodiment described, but is capable of modification and rearrangement and substitution of parts and elements without departing from the spirit of the invention.

What is claimed is:

1. A method of making magnetic tape transducer heads including the steps of:
- forming a plurality of interconnected core halves and at least one locating surface in each of two sheets of magnetic material;
- forming at least one locating surface on each of two housings of non-magnetic material;
- engaging the locating surface on each sheet with the locating surface on a housing;
- mounting the sheets in their respective housings with the locating surfaces of the sheets in engagement with the locating surface of their respective housings;
- placing a coil of conductive material around each of the mounted core halves in one of the housings;
- engaging the mounted core halves in the other of the housings with the mounted core halves in said one of the housings; and
- securing said one of the housings and said other of the housings together thereby securing each core half in said one of the housings with a core half in the other of the housings.

2. The method of making magnetic tape transducer heads according to claim 1 including the additional step of simultaneously machining the housings that have been secured together and the sheets of cores halves which are mounted in the housings into a predetermined configuration with respect to the locating surfaces of the sheets.

3. The method of making magnetic tape transducer heads according to claim 2 wherein the step of mounting the sheets of interconnected core halves in a housing includes the steps of:
- individually attaching each of the core halves and the portion of the interconnection between the core halves having the locating surface formed on it to the frame; and
- removing the sheet of magnetic material from the core halves and the portion of the interconnection having the locating surface formed on it thereby leaving the core halves and the portion of the interconnection having the locating surface on it separately and individually attached to the housing.

4. The method of making magnetic tape transducer heads according to claim 1 wherein the step of mounting the sheets of interconnected core halves includes the step of forming two end surfaces on each of the core halves and wherein the step of engaging the core halves includes the steps of:
- placing a shim of nonmagnetic material over a first of the end surfaces of each of the mounted core halves in said one of the housings; and
- moving one of the end surfaces of each of the mounted core halves on said other of the housings through one of the coils of conductive material which are on the core halves in said one of the housings and into engagement with a second of the end surfaces of one of the core halves in said one of the housings.

5. A method of manufacturing magnetic tape transducer heads including the steps of:
- forming a coil unit receiving cavity, a plurality of core half receiving slots and a locating surface in each of a pair of housings;
- forming a plurality of core halves and a locating surface in each of two sheets of magnetic material;
- engaging the locating surface of each sheet of magnetic material with the locating surface of a housing;
- mounting each sheet in the housing with which its locating surface is engaged;
- molding a plastic block around each coil of a plurality of coils of conductive material to form a plurality of coil units;
- mounting the plurality of coil units in a first of the housings with each of the coils of conductive material of the coil units surrounding a portion of one of the core halves mounted in the first of the housings and with the coil units each positioned in the coil unit receiving cavity of the first of the housings;
- placing the second of the housings in engagement with the first of the housings with the coils of the coil units each surrounding a portion of one of the core halves mounted in the second of the housings and with the coil units each positioned in the coil unit receiving cavity of the second of the housings; and
- securing the first and the second housings together.

6. The method of manufacturing magnetic tape transducer heads according to claim 5 wherein the step of mounting each of the formed sheets of magnetic material on one of the housings includes the steps of:
- positioning the core halves of one of the sheets of magnetic material in the core half receiving slots of one of the housings;
- attaching the core halves of the sheet of magnetic material to the housing; and
- removing the sheet of magnetic material from the core halves thereby leaving the core halves each individually attached to the housing.

7. The method of manufacturing magnetic tape transducer heads according to claim 5 wherein:
- the step of forming a plurality of core halves includes the step of forming a locating surface on each of the sheets of magnetic material;
- the step of mounting each of the formed sheets includes the step of attaching the portion of the sheets having the locating surface formed thereon to the housing; and
- including the additional step of simultaneously machining the first and second housing and the core halves mounted on the housings into a predetermined configuration with respect to the locating surfaces mounted on the housings.

8. The method of manufacturing magnetic tape transducer heads according to claim 5 wherein the step of molding a plastic block around each coil of a plurality of coils of conductive material includes the steps of:
- attaching terminal pins to the leading ends of each coil of a plurality of coils of conductive material;
- positioning the terminal pins and the coil of conductive material of each of the coils in a predetermined position with respect to each other; and
- molding an individual plastic block around portions of the terminal pins and around the coil of conductive material of each of the coils to form a plurality of coil units each having a coil of conductive material and a pair of terminal pins attached thereto.

9. The method of manufacturing magnetic tape transducer heads according to claim 8 wherein the step of mounting a plurality of coil units in a first of the housings includes the step of positioning the terminal pins of each of the coil units in a connector block array and wherein the step of securing the first and the second housings together includes the step of securing the terminal pins of the coil units in the connector block array so that a connector block may be attached to the completed transducer head.

10. A method of forming a subassembly for use in manufacturing magnetic tape transducer heads including the steps of:

forming a plurality of core halves and at least one locating surface in a sheet of magnetic material;

mounting the formed sheet of magnetic material in a housing of nonmagnetic material; and removing the interconnections between the individual core halves and the interconnections between the core halves and the locating surfaces while leaving the core halves and the locating surfaces mounted in the housing.

11. The method of forming a subassembly for use in manufacturing magnetic tape transducer heads according to claim 10 including the additional step of:

annealing the sheet of magnetic material having the core halves and the locating surface formed on it to a dead soft condition before mounting the sheet in a housing.

12. The method of forming a subassembly for use in manufacturing magnetic tape transducer heads according to claim 10 wherein the step of mounting a formed sheet of magnetic material includes the step of attaching each of the core halves and the portion of the sheet containing the locating surface individually to the housing.

13. The method of forming a subassembly for use in manufacturing magnetic tape transducer heads according to claim 10 wherein the step of mounting a formed sheet of magnetic material includes the steps of:

forming a locating surface on a housing of magnetic material;

engaging the locating surface on the sheet of magnetic material with the locating surface on the housing; and attaching the formed sheet of magnetic material to the housing with the locating surface on the sheet in engagement with the locating surface on the housing.

References Cited

UNITED STATES PATENTS

| | | | |
|---|---|---|---|
| 2,743,507 | 5/1956 | Kornei | 29—603 |
| 2,915,812 | 12/1959 | Rettinger | 179—100.2 X |
| 3,049,790 | 8/1962 | Camras | 29—603 |
| 3,163,720 | 12/1964 | Netznik. | |
| 3,211,843 | 10/1965 | Dundovic et al. | |
| 3,217,389 | 11/1965 | Neumann et al. | 29—603 |
| 3,242,556 | 3/1966 | Broughton | 29—603 |
| 3,353,261 | 11/1967 | Badford et al. | 29—603 |
| 3,357,097 | 12/1967 | Schulte | 29—603 |
| 3,359,629 | 12/1967 | Smith | 29—603 |

JOHN F. CAMPBELL, *Primary Examiner.*

D. C. REILEY, *Assistant Examiner.*